Nov. 7, 1933.    G. V. BUTLER    1,933,964
MIRROR ATTACHMENT
Filed Oct. 17, 1932
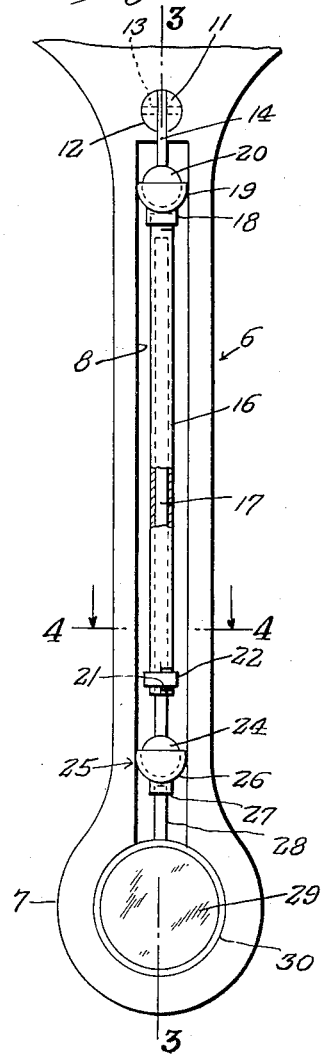
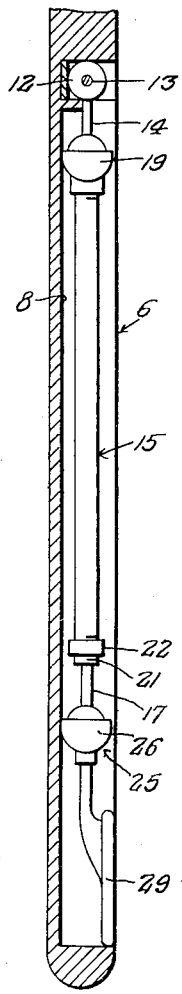
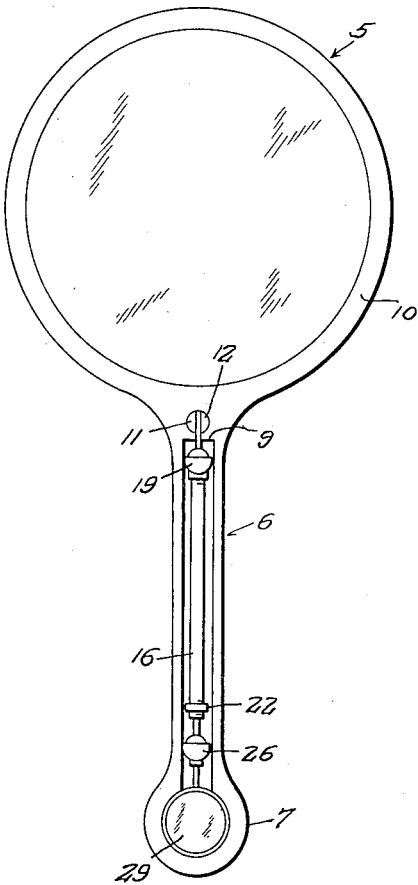
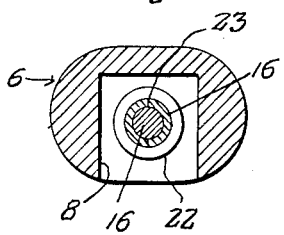
Inventor
G. V. Butler,
By Clarence A. O'Brien
Attorney Patented Nov. 7, 1933

1,933,964

UNITED STATES PATENT OFFICE 1,933,964

MIRROR ATTACHMENT

George V. Butler, Luverne, Minn., assignor of one-fourth to Jason E. Treat, Luverne, Minn.

Application October 17, 1932. Serial No. 638,237

3 Claims. (Cl. 45—99)

My invention relates generally to mirror attachments and particularly to an attachment of the nature of a dental mirror to be incorporated in an ordinary mirror, for the purpose of enabling a dental patient to view any of his teeth in the mirror.

It is an important object of my invention to provide means for assembling a dental mirror to an ordinary mirror so that the dental mirror will not impair the usefulness of the ordinary mirror in its ordinary functions.

It is also an important object of my invention to incorporate a dental mirror in an ordinary mirror in a compact and efficient arrangement whereby a fixed relation may be adjustably established between the dental mirror and the ordinary mirror, so that the dental mirror may be placed within the mouth of a patient and reflect appearances therein to the hand mirror where they may be seen by the patient.

Other objects and advantages of my invention will be apparent from a reading of the following description of the drawing, wherein for purposes of illustration I have shown a preferred embodiment of the invention.

In the drawing:—

Figure 1 is a plan view of an embodiment of the invention.

Figure 2 is a similar view enlarged of the handle portion of the embodiment.

Figure 3 is a longitudinal sectional view through Figure 2 the section being taken on line 3—3 of Figure 2.

Figure 4 is a transverse sectional view therethrough the section being taken on line 4—4 of Figure 2.

Referring in detail to the drawing, the numeral 5 generally designates a suitable form of hand mirror possessing the handle 6 which may be circularly enlarged as indicated at 7 at its outer end.

Extending longitudinally in the handle portion 6 is a recess 8 which extends from a point 9 near the mirror frame 10 to and into the circularly enlarged end portion 7 of the handle. Between the mirror frame 10 and the end portion 9 of the recess 8 is another recess 11 in which is disposed a hinge member generally designated 12 including a hinge pin 13 on which is swingably connected a bar 14 by means of which the adjustable dental mirror 15 is adjustably connected to the hand mirror 5. The dental mirror 15 is adapted to be nested in the recess 8 so that it is either flush or below the edges of the handle portion 6, so as not to interfere with the free use of the hand mirror 5 when being employed as such. However, the handle need not be recessed.

The dental mirror 15 comprises a sleeve or handle portion 16 through the major portion of which extends a reenforcing rod 17. At one end of the tubular member 16 is a collar 18 fixedly secured thereto and having mounted thereon the female member 19 of a ball and socket connection, the male member of which is indicated by the numeral 20 and is solidly connected to the bar 14.

The opposite end of the tubular handle portion 16 is exteriorly screw-threaded as indicated at 21 and receives thereon the threaded adjusting ring or collar 22. The threaded portion 21 is split as indicated by the numeral 23 in Figure 4 and tapered so that when the ring 22 is turned thereon in one direction, the rod 17 which is telescoped into the tubular handle portion 16 so as to be longitudinally adjustable thereof may be clamped in adjusted extended position.

On the end of the rod 17 exterior of the tubular handle portion 16 is a male member 24 of a ball and socket swivel joint generally designated 25 of which the female member 26 is connected by a collar 27 which is threaded to receive the handle portion 28 of a conventional dental mirror 29. A suitable circular or other properly formed expanded portion of the recess 8 extends into the circularly enlarged end portion 7 of the handle and accommodates the dental mirror in the flush disposition shown in the drawing. This circular enlargement of the recess 8 is indicated by the numeral 30 as seen in Figure 2.

When the combination is desired to be used by a patient, the dental mirror structure is swung relatively to the hand mirror structure until a desired relative angularity is achieved between the dental mirror 29 and the hand mirror 5, so that an image of a tooth or other portion of the interior of the mouth of the patient incident upon the dental mirror will be reflected by the dental mirror to and upon the hand mirror, which is maintained in a clearly visible relation by the patient.

It will be observed that the dental mirror may be extended, changed as to angularity in an unlimited number of planes, and rotated on its axis to assume any desired position. It is obvious that the patient may adjust the dental mirror within his mouth so as to direct the same at any tooth or other formation, and may then look in the hand mirror to obtain a clear and unobstructed view of the part being examined.

It is thought from the foregoing description that the advantages and novel features of the invention will be readily apparent.

It is to be understood that changes may be made in the construction and in the combination and arrangement of the several parts, provided that such changes fall within the scope of the appended claims.

What is claimed is:—

1. In combination, a hand mirror having a handle member, an auxiliary mirror connected to the handle portion and adjustable relative to the hand mirror, and a recess in the handle member of the hand mirror for nesting the auxiliary mirror.

2. A dental accessory comprising a large mirror, a handle member on the large mirror, an auxiliary mirror connected to the handle member and adjustable with respect to the hand mirror, and a recess in the handle member of the hand mirror for nesting the auxiliary mirror when the same is not in use, said auxiliary mirror being adapted to be placed by a patient into his mouth and adjusted so as to reflect an image of a part desired to be examined so as to appear in the hand mirror.

3. A dental accessory comprising a large mirror, a handle member on the large mirror, an auxiliary mirror, a handle connected therewith, a rod, a ball and socket connection between the rod and the handle of the auxiliary mirror, a sleeve in which the rod is adjustably mounted for sliding movement, a second rod hingedly connected to the handle member of the large mirror adjacent the inner end of said handle member and a ball and socket connection between the sleeve and said second rod.

GEORGE V. BUTLER.